(12) United States Patent
Qiu et al.

(10) Patent No.: US 11,519,578 B2
(45) Date of Patent: Dec. 6, 2022

(54) VEHICLE LAMP ASSEMBLY, VEHICLE LAMP, AND VEHICLE

(71) Applicant: HASCO VISION TECHNOLOGY CO., LTD., Shanghai (CN)

(72) Inventors: Zhiping Qiu, Shanghai (CN); Weigang Gong, Shanghai (CN); Dapan Zhang, Shanghai (CN); He Zhu, Shanghai (CN); Wenhui Sang, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/607,042

(22) PCT Filed: Sep. 29, 2019

(86) PCT No.: PCT/CN2019/108983
§ 371 (c)(1),
(2) Date: Oct. 28, 2021

(87) PCT Pub. No.: WO2021/046939
PCT Pub. Date: Mar. 18, 2021

(65) Prior Publication Data
US 2022/0205606 A1 Jun. 30, 2022

(30) Foreign Application Priority Data

Sep. 11, 2019 (CN) .......................... 201910858526.6
Sep. 11, 2019 (CN) .......................... 201921510243.4

(51) Int. Cl.
*F21S 41/25* (2018.01)
*F21S 41/24* (2018.01)
(Continued)

(52) U.S. Cl.
CPC .............. *F21S 41/25* (2018.01); *F21S 41/24* (2018.01); *F21S 41/36* (2018.01); *G02B 6/0031* (2013.01)

(58) Field of Classification Search
None
See application file for complete search history.

(56) References Cited

U.S. PATENT DOCUMENTS

2017/0030543 A1* 2/2017 Gromfeld ............. F21S 41/322
2017/0292671 A1* 10/2017 Gousset-Rousseau ......................
F21S 41/322

FOREIGN PATENT DOCUMENTS

CN 103256564 A 8/2013
CN 104296036 Y 1/2015
(Continued)

*Primary Examiner* — Elmito Breval (57) ABSTRACT

The present disclosure proposes a vehicle lamp assembly, which includes a plurality of light sources, a primary optical element, and a secondary optical element, the primary optical element includes a primary optical element body and a plurality of light incident parts, the plurality of light sources is in one-to-one correspondence with the plurality of light incident parts, the primary optical element body includes a main reflector and an edge reflector arranged on a left edge and/or right edge of the main reflector, the plurality of light incident parts includes an edge light incident part located on a left side and/or right side, at least a part of light emitted from the edge light incident part is reflected to the secondary optical element by the edge reflector, and a remaining part of the light is reflected to the secondary optical element by the main reflector.

8 Claims, 8 Drawing Sheets

(51) Int. Cl.
*F21S 41/36* (2018.01)
*F21V 8/00* (2006.01)

(56) References Cited

FOREIGN PATENT DOCUMENTS

| | | |
|---|---|---|
| CN | 105588050 A | 5/2016 |
| CN | 105822970 A | 8/2016 |
| CN | 106439672 Y | 2/2017 |
| CN | 107270211 A | 10/2017 |
| CN | 109519865 A | 3/2019 |
| CN | 110440217 E | 11/2019 |
| CN | 210373267 E | 4/2020 |
| EP | 2607165 A | 6/2013 |

* cited by examiner

VEHICLE LAMP ASSEMBLY, VEHICLE LAMP, AND VEHICLE

CROSS REFERENCE TO RELATED APPLICATION

This is a Sect. 371 National Stage of PCT International Application No. PCT/CN2019/108983, filed on 29 Sep. 2019, which claims priority of a Chinese Patent Application No. 2019108585266 filed on 11 Sep. 2019, and a Chinese Patent Application No. 2019215102434 filed on 11 Sep. 2019, the contents of which are incorporated herein by reference in their entireties for all purposes.

BACKGROUND

Field of Disclosure

The present disclosure relates to the technical field of vehicle lighting, in particular to a vehicle lamp assembly.

The present disclosure further relates to a vehicle lamp including the above-mentioned vehicle lamp assembly.

The present disclosure further relates to a vehicle including the above-mentioned vehicle lamp.

Description of Related Arts

In the technical field of vehicle lighting, vehicle lamp assemblies generally refer to low beam and/or high beam lighting assemblies in vehicle headlights. Optical components of the vehicle lamp assembly include a light source, a primary optical element, and a secondary optical element. The primary optical element includes a mirror, a condenser, etc., and the secondary optical element is generally a lens.

In recent years, there have been more and more researches on the application of distributed light sources in vehicle lamp assemblies, and more and more product applications. The distributed light source means that the low beam and/or high beam light sources of the vehicle lamps are scattered and arranged on the same circuit board or different circuit boards, with specific primary and secondary optical elements to achieve the low beam and/or high beam lighting. For distributed light sources, light sources that serve as heat sources are separated, the heat sources can be dispersed at a certain spatial distance, so that the heat is dispersed, which is beneficial to heat dissipation. Therefore, the arrangement of the distributed light source greatly improves the heat dissipation performance of the vehicle lamp, and thus the application of the distributed light source in the vehicle lamp assembly gradually increases.

The low beam lighting mode is important in vehicle lighting, which can enable the driver to have good near-field visibility in the absence of street lights and driving at low speeds. For the driver to have a good observation of the road conditions on both sides of the front of the vehicle, the left and right sides of the low beam pattern formed by the vehicle lamp assembly are required to have a larger widening angle. The widening angles on the left and right sides of the low beam pattern in the art are each designed to be about 40°, preferably greater than 40°.

Figure 1:
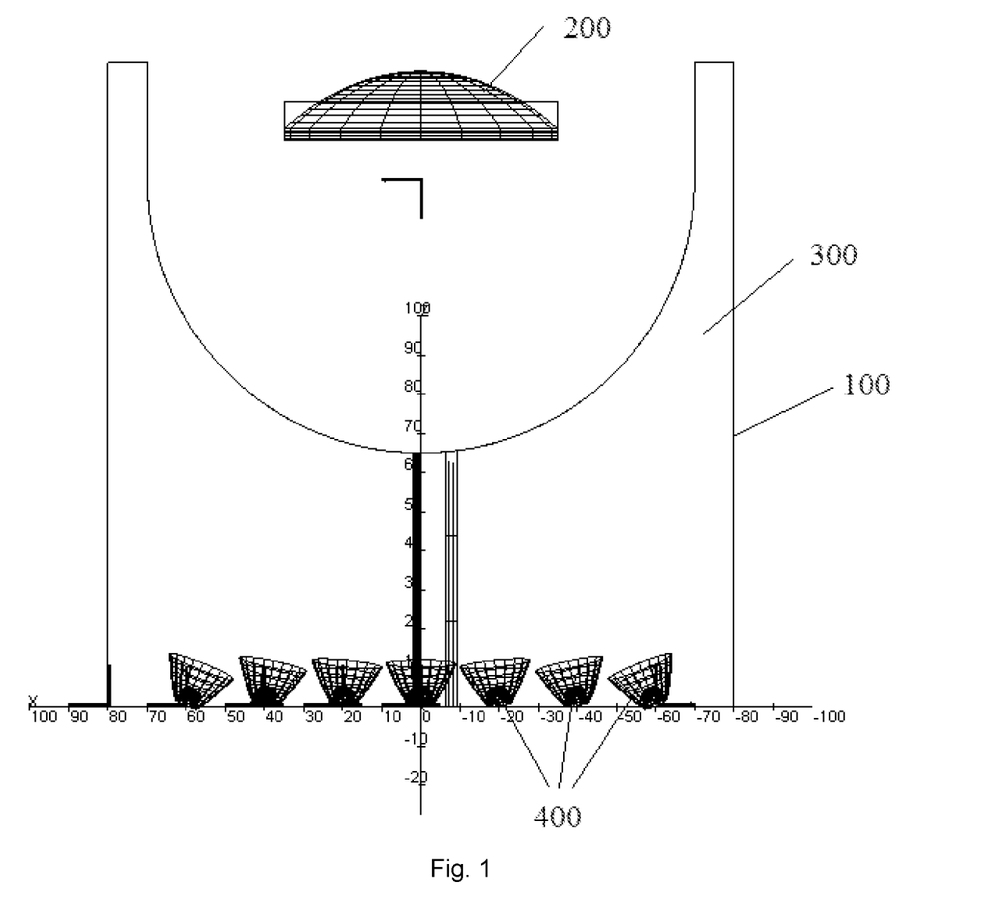
FIG. 1 shows a schematic view of a vehicle lamp assembly forming a low beam pattern with a small widening angle in the prior art.

Further, the traditional LED light source vehicle lamp assembly adopts distributed light sources and can realize the single low beam function and the integrated function of the low beam and high beam. Specifically, as shown in FIG. 1, the LED light source vehicle lamp assembly in the prior art includes a low beam condenser 100, a lens 200, a lens holder, a heat radiator, and a low beam LED circuit board.

The low beam condenser 100 is a primary optical element of the LED light source vehicle lamp assembly, and is used to form a low beam pattern. The primary optical element includes a primary optical element body 300, and a plurality of light incident parts 400 (i.e., a low beam condensing structure) arranged at the rear end of the primary optical element body 300. The plurality of light incident parts 400 is sequentially arranged in the horizontal direction. Each light incident part 400 corresponds to a light source, so the plurality of scattered light incident parts 400 corresponds to a plurality of distributed light sources.

Figure 2:
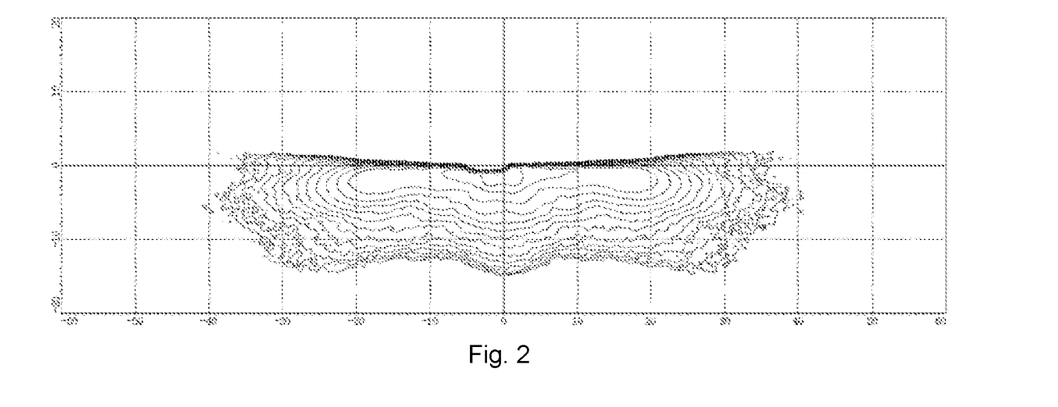
FIG. 2 shows a low beam pattern formed by the vehicle lamp assembly shown in FIG. 1.
Figure 3:
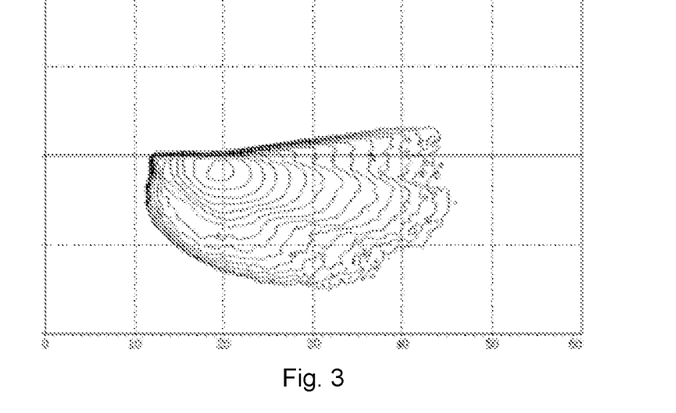
FIG. 3 shows a light pattern formed by a light source located on the leftmost side of the vehicle lamp assembly shown in FIG. 1 in cooperation with its corresponding light incident part of a primary optical element.

In the above-mentioned vehicle lamp assembly with distributed light sources, the light sources sequentially arranged from the central axis of the lens 200 to the left and right ends and the light incident parts 400 in the primary optical element matched with the light sources respectively and sequentially form the middle and outer portions of the vehicle lamp pattern. Specifically, taking the low beam lamp assembly as an example, as shown in FIGS. 1 and 2, the middle light source and the light incident part 400 matched with the middle light source in FIG. 1 form the middle portion of the low beam pattern shown in FIG. 2. The left light source and the light incident part 400 matched with the left light source in FIG. 1 form the right portion of the low beam pattern shown in FIG. 2. The right light source and the light incident part 400 matched with the right light source in FIG. 1 form the left portion of the low beam pattern shown in FIG. 2. Therefore, the leftmost light source and the light incident part 400 matched with the leftmost light source form the rightmost portion of the low beam pattern shown in FIG. 2. The pattern of the rightmost portion is shown in FIG. 3, and it can be seen from FIG. 3 that its widening angle is small.

Figure 4:
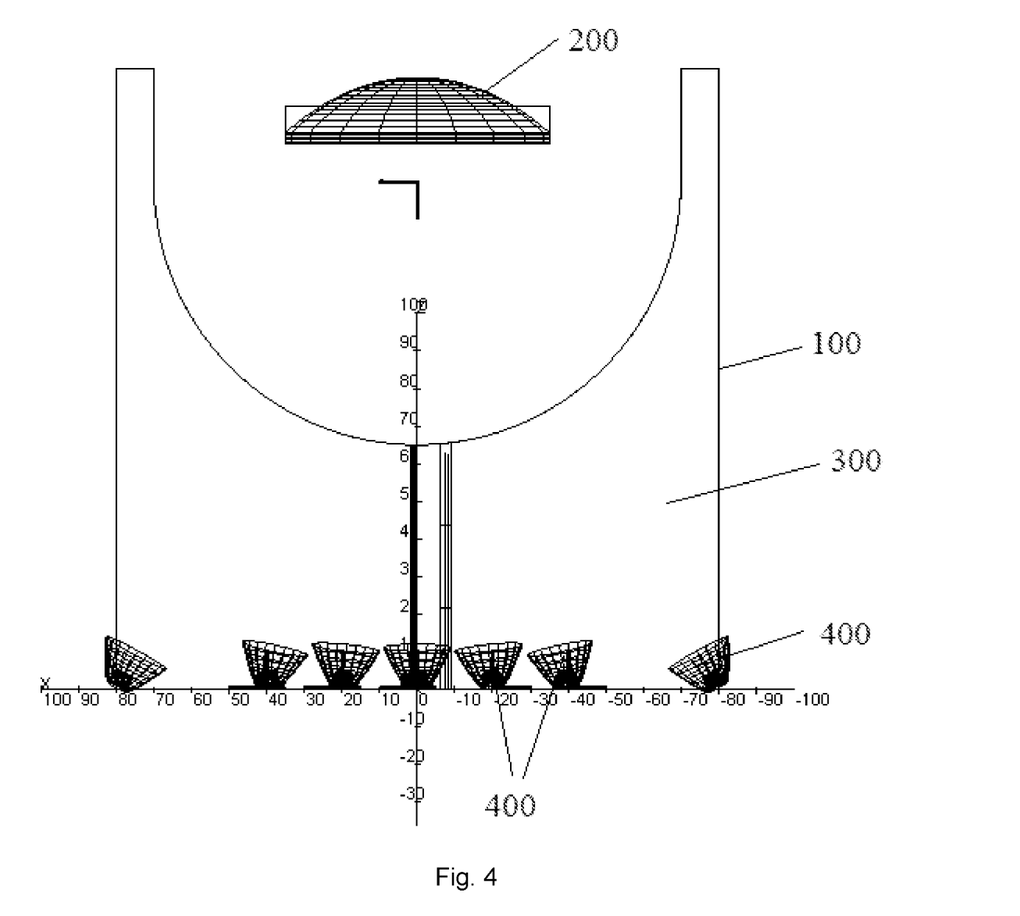
FIG. 4 shows a schematic view of a vehicle lamp assembly forming a low beam pattern with a large widening angle in the prior art.
Figure 5:
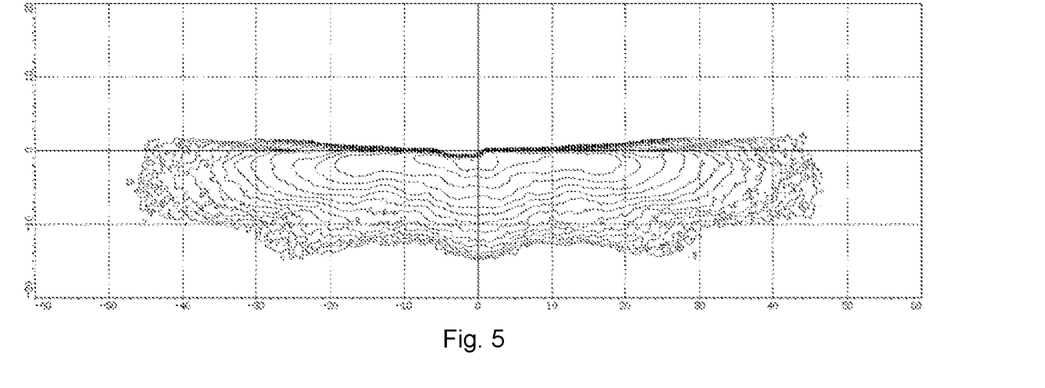
FIG. 5 shows a low beam pattern formed by the vehicle lamp assembly shown in FIG. 4.
Figure 6:
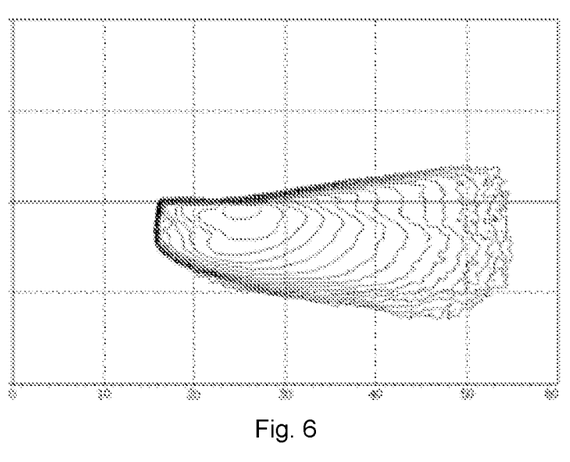
FIG. 6 shows a light pattern formed by a light source located on the leftmost side of the vehicle lamp assembly shown in FIG. 4 in cooperation with its corresponding light incident part of a primary optical element.

Further, when the widening angle of the left and right sides of the low beam pattern formed by the vehicle lamp assembly is small, the widening angle can be increased by the following methods. Method 1: adding light sources on the left and right sides of the vehicle lamp assembly, and light incident parts of the primary optical element matched with the light sources to increase the widening angle of the left and right sides of the low beam pattern formed by the vehicle lamp assembly. Method 2: Moving the light sources on the left and right sides and the light incident parts of the primary optical element matched with the light sources to the outside in the horizontal direction, as shown in FIG. 4, so that the light emitted from the light sources on the left and right sides illuminate a wide range of angles to increase the widening angle of the low beam pattern formed by the vehicle lamp assembly, as shown in FIGS. 5 and 6. The leftmost light source and the light incident part matched with the leftmost light source in FIG. 4 form the rightmost portion of the low beam pattern shown in FIG. 5. The low beam pattern of the rightmost portion is shown in FIG. 6. Comparing FIG. 3 with FIG. 6, it can be seen that the widening angle of the low beam pattern shown in FIG. 6 is larger than the widening angle of the low beam pattern shown in FIG. 3. The above two methods for increasing the widening angle of the left and right sides of the low beam pattern will increase the size of the primary optical element in the horizontal direction, thereby increasing the space occupied by the primary optical element in the horizontal direction, thereby correspondingly increasing the size and space occupied by the vehicle lamp assembly in the horizontal direction. In addition, the increase in the size of the primary optical element and the circuit board matched with the primary optical element will also increase the cost of the vehicle lamp assembly.

SUMMARY

The present disclosure proposes a vehicle lamp assembly, which does not increase the size of the primary optical element in the horizontal direction while increasing the widening angle of the low beam pattern, and can reduce costs.

The present disclosure proposes a vehicle lamp assembly, which includes a plurality of light sources, a primary optical element, and a secondary optical element placed in front of the primary optical element, the primary optical element includes a primary optical element body, and a plurality of light incident parts horizontally arranged at a rear end of the primary optical element body, the plurality of light sources is in one-to-one correspondence with the plurality of light incident parts, the primary optical element body includes a main reflector, and an edge reflector arranged on a left edge and/or right edge of the main reflector, the plurality of light incident parts includes an edge light incident part located on a left side and/or right side, at least a part of light emitted from the edge light incident part is reflected to the secondary optical element by the edge reflector, and a remaining part of the light is reflected to the secondary optical element by the main reflector.

Further, among the plurality of light incident parts, the remaining light incident parts except for the edge light incident parts are middle light incident parts, a part of light emitted from the middle light incident parts directly enters the secondary optical element, and a remaining part of the light is reflected to the secondary optical element by the main reflector.

Further, an optical axis of the edge light incident part is inclinedly arranged in a manner that the farther forward, the closer to the edge reflector.

Further, a position of the edge reflector and the edge light incident part in the primary optical element is set by the following operations: setting a virtual light incident part according to a desired widening angle of a light pattern of a vehicle lamp, and adjusting an inclination angle of the virtual light incident part to make a direction of light emitted by the virtual light incident part meet the desired widening angle of the light pattern of the vehicle lamp; the virtual light incident part includes an innermost virtual light incident part closest to a middle of the primary optical element, a reflector close to the innermost virtual light incident part and extending in a front-rear direction is placed on a side of the innermost virtual light incident part close to the middle of the primary optical element, the reflector is the edge reflector; and obtaining a mirrored light incident part by mirroring the virtual light incident part with the edge reflector, and the mirrored light incident part is the edge light incident part.

Further, the edge reflector extends in a front-rear direction and is perpendicular to the main reflector.

Further, the plurality of light sources is arranged on the same circuit board, and the circuit board has a planar structure.

Further, the main reflector and the edge reflector have an integrated structure or a split structure.

Further, a front edge of the main reflector is a section of arc that is concave backward, and a cut-off portion is placed on the section of arc.

The present disclosure further proposes a vehicle lamp, which includes the vehicle lamp assembly described above.

The present disclosure further proposes a vehicle, which includes the vehicle lamp described above.

As described above, the vehicle lamp assembly, the vehicle lamp, and the vehicle of the present disclosure have the following beneficial effects:

In the present disclosure, the edge light incident part emits light toward the edge reflector, and the edge reflector matches with the edge light incident part. The present disclosure can increase the widening angle of the left side and/or right side of the light pattern of the vehicle lamp formed by the vehicle lamp assembly, to meet the requirements of a large widening angle of the light pattern of the vehicle lamp. On the premise of reaching the same widening angle, compared with the prior art, the size of the primary optical element in the present disclosure is smaller in the horizontal direction. Therefore, the present disclosure can reduce the size of the primary optical element in the horizontal direction while increasing the widening angle, thereby correspondingly reducing the overall size and occupied space of the vehicle lamp assembly, thus reducing the production cost of the vehicle lamp assembly. In particular, the primary optical element body in the present disclosure adopts a plate-shaped structure, which can save materials and reduce costs.

DESCRIPTION OF REFERENCE NUMERALS

100 Low beam condenser
200 Lens
300 Primary optical element body
400 Light incident part
10 Light source
20 Primary optical element
30 Primary optical element body
31 Edge reflection part
31L Left reflection part
31R Right reflection part 32 Main reflector
33 Edge reflector
33L Left reflector
33R Right reflector
34 Light emitting surface
35 Lower reflecting surface
36 Cut-off portion
40 Light incident part
41 Edge light incident part
41L Left light incident part
41R Right light incident part
42 Middle light incident part
50 Secondary optical element
60 Virtual light incident part
61L Left virtual light incident part

DETAILED DESCRIPTION OF THE PREFERRED EMBODIMENTS

The embodiments of the present disclosure will be described below. Those skilled may easily understand other advantages and effects of the present disclosure according to contents disclosed by the specification.

It should be understood that the structures, proportions, sizes, and the like, which are illustrated in the drawings of the present specification, are only used to clarify the contents disclosed in the specification for understanding and reading by those skilled, and are not intended to limit the implementation of the present disclosure, thus are not technically meaningful. Any modification of the structure, change of the scale, or adjustment of the size should still fall within the scope of the technical contents disclosed by the present disclosure without affecting the effects and achievable objectives of the present disclosure. In the meantime, the terms "upper", "lower", "left", "right", "intermediate" and "one" as used in this specification are also for convenience of description, and are not intended to limit the scope of the present disclosure, and the change or adjustment of the relative relationship is considered to be within the scope of the present disclosure without substantial changes in technology.

The present disclosure provides a vehicle, specifically relates to the field of vehicle lighting. Further, the present disclosure provides a vehicle lamp for a vehicle, particularly a vehicle lamp assembly for a vehicle lamp.

Figure 7:
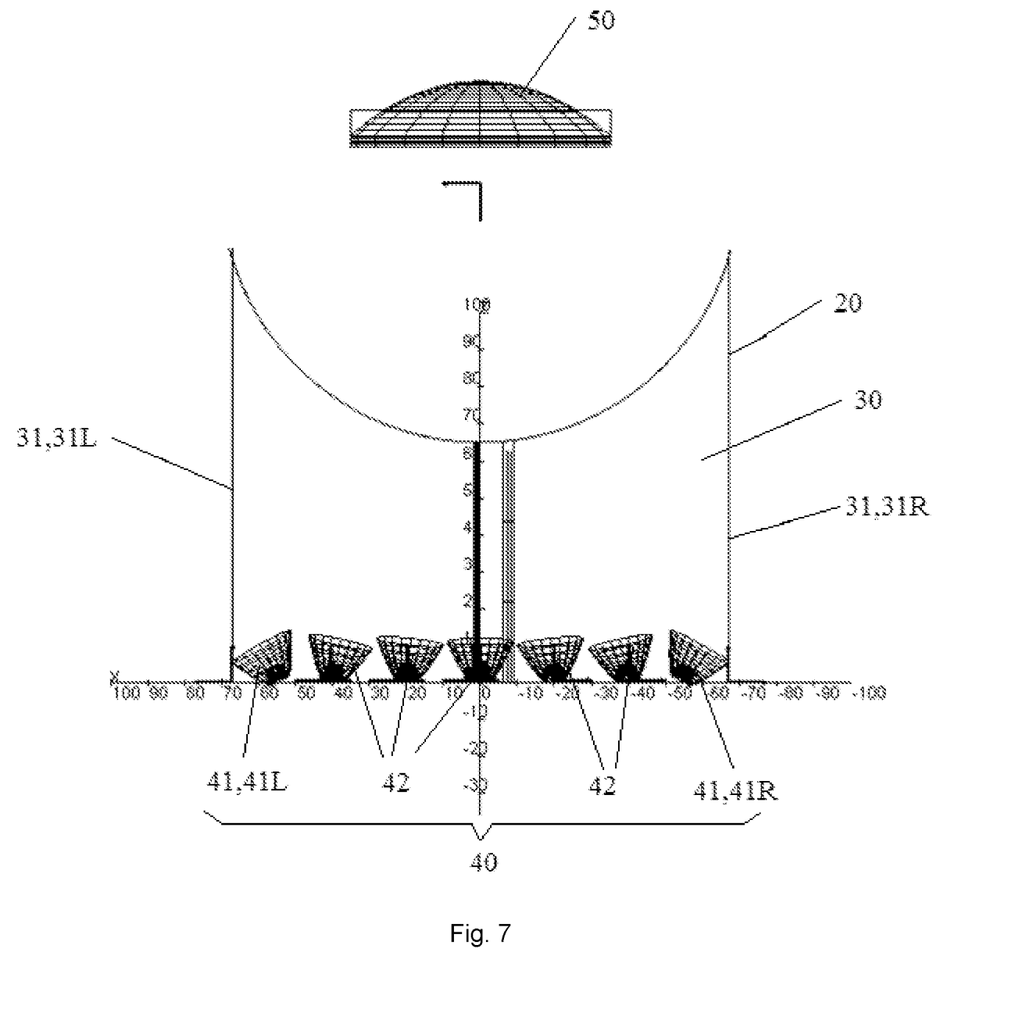
FIG. 7 shows a schematic view of the vehicle lamp assembly according to the present disclosure.
Figure 10:
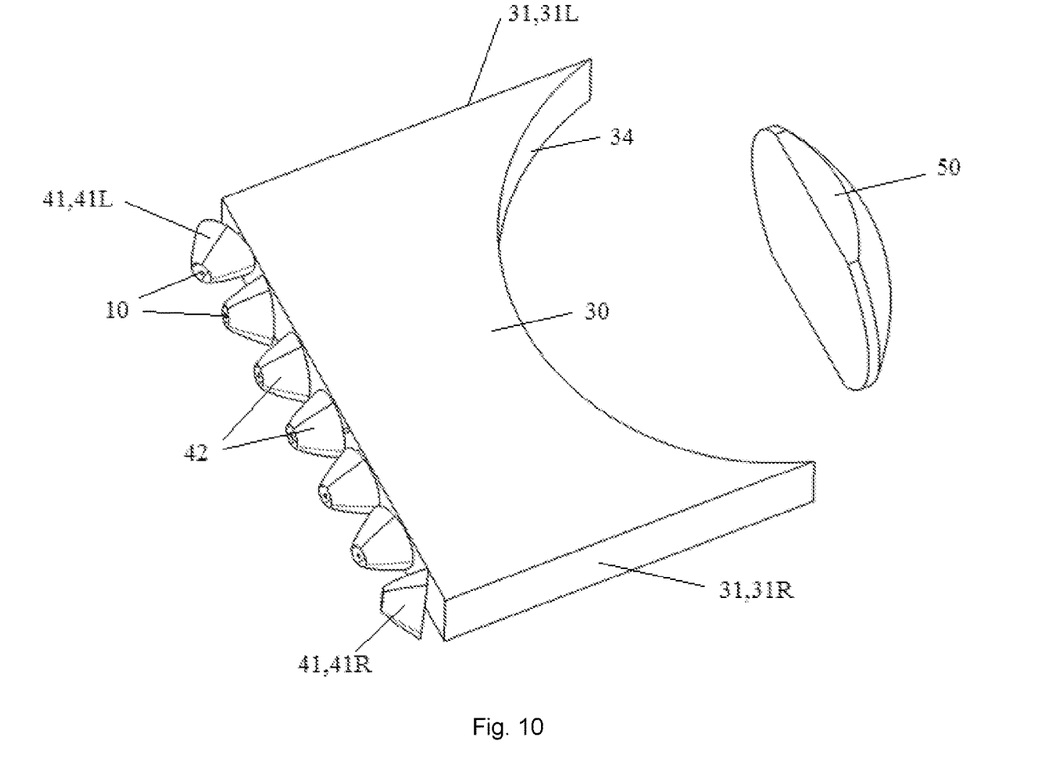
FIGS. 10-12 show schematic views of the vehicle lamp assembly in Embodiment 1 from different perspectives according to the present disclosure.
Figure 13:
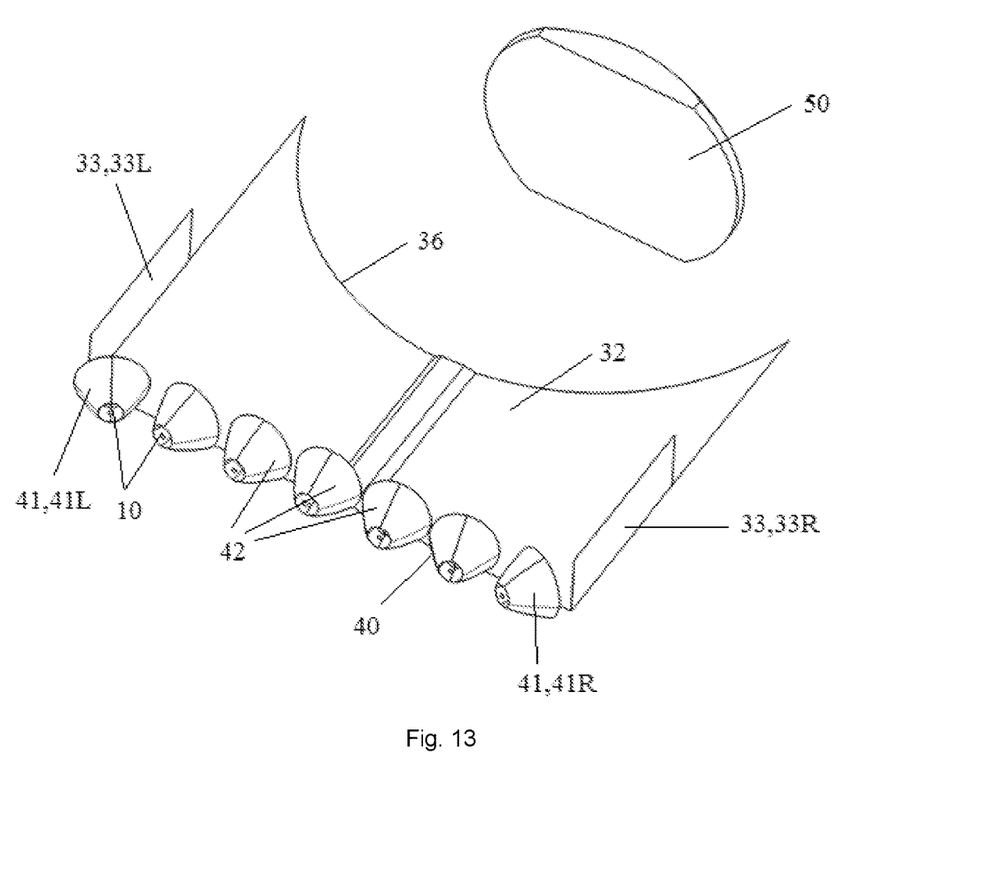
FIG. 13 shows a schematic view of the vehicle lamp assembly in Embodiment 2 according to the present disclosure.

As shown in FIGS. 7 and 10, or FIGS. 7 and 13, the vehicle lamp assembly in the present disclosure includes a plurality of light sources 10, a primary optical element 20, and a secondary optical element 50 placed in front of the primary optical element 20. The primary optical element 20 is a condenser, and the secondary optical element 50 is a lens. The primary optical element 20 includes a primary optical element body 30, and a plurality of light incident parts 40 arranged at a rear end of the primary optical element body 30 and arranged in a left-right direction. The light incident part 40 is the light condensing structure of the condenser, and is shaped like a condenser cup. The vehicle lamp assembly adopts distributed light sources. As shown in FIG. 10 or FIG. 13, the plurality of light sources 10 are in one-to-one correspondence with the plurality of light incident parts 40, that is, each light incident part 40 corresponds to one light source 10. The light incident part 40, the light source 10, and the secondary optical element 50 all have optical axes. The optical axis refers to an axis that passes through the focal point and extends in a forward-backward direction. Therefore, the optical axis of the light incident part 40 refers to the axis passing through the focal point of the light incident part 40. The focal point of the light incident part 40 is set on the light emitting center of the light source 10. The optical axis of the light source 10 refers to the axis passing through the light emitting center of the light source 10. The optical axis of the secondary optical element 50 refers to the axis passing through the focal point of the lens. In particular, as shown in FIG. 7, the left edge side and/or right edge side of the primary optical element body 30 includes an edge reflection part 31. The plurality of light incident parts 40 includes an edge light incident part 41 located on the left and/or right side and a middle light incident part 42. The light emitting direction of the edge light incident part 41 faces towards the edge reflection part 31, that is, towards the outside of the primary optical element body 30. The edge light incident part 41 is one or several light incident parts 40 located on the outer side (left and/or right) of the plurality of light incident parts 40, and the edge light incident part 41 located at the outermost (leftmost and/or rightmost) side is close to the edge reflection part 31.

In the above-mentioned vehicle lamp assembly, the edge reflection part 31 may be placed only on the left edge side of the primary optical element body 30, and the edge reflection part 31 is defined as the left reflection part 31L. The edge light incident part 41 whose light emitting direction is toward the left reflection part 31L is defined as the left light incident part 41L. The number of the left light incident part 41L may be one or more. When the number of the left light incident part 41L is one, the left light incident part 41L is next to the right of the left reflection part 31L, and at the same time, the left light incident part 41L is the leftmost light incident part 40 among the plurality of light incident parts 40. When the number of the left light incident parts 41L is multiple, the multiple left light incident parts 41L are arranged in the left-right direction and are all arranged on the left side of the multiple light incident parts 40. The left light incident part 41L on the leftmost side is next to the right of the left reflection part 31L. At this time, the left light incident part 41L and the left reflection part 31L cooperate to form a vehicle lamp light pattern located on the right side of the entire light pattern, thereby realizing a vehicle lamp light pattern with a single right side large widening angle.

Alternatively, in the above-mentioned vehicle lamp assembly, the edge reflection part 31 may be placed only on the right edge of the primary optical element body 30, and the edge reflection part 31 is defined as the right reflection part 31R. The edge light incident part 41 whose light emitting direction is toward the right reflection part 31R is defined as the right light incident part 41R. The right light incident part 41R may be one or more. When the number of the right light incident part 41R is one, the right light incident part 41R is next to the left of the right reflection part 31R. At the same time, the right light incident part 41R is the rightmost light incident part 40 among the plurality of light incident parts 40. When the number of the right light incident parts 41R is multiple, the multiple right light incident parts 41R are arranged in the left-right direction and are arranged on the right side of the multiple light incident parts 40. The right light incident part 41R on the far right is next to the left of the right reflection part 31R. At this time, the right light incident part 41R and the right reflection part 31R cooperate to form a vehicle lamp light pattern located on the left side of the entire light pattern, thereby realizing a vehicle lamp light pattern with a single left side large widening angle.

Alternatively, in the above-mentioned vehicle lamp assembly, as shown in FIG. 7, edge reflection parts 31 are placed on both the left edge and the right edge of the primary optical element body 30. The two edge reflection parts 31 are respectively a left reflection part 31L placed on the left edge of the primary optical element body 30 and a right reflection part 31R placed on the right edge of the primary optical element body 30. At this time, the edge light incident part 41 includes a left light incident part 41L that emits light towards the left reflection part 31L, and a right light incident part 41R that emits light towards the right reflection part 31R. The left light incident part 41L cooperates with the left reflection part 31L, and the right light incident part 41R cooperates with the right reflection part 31R to realize a vehicle lamp light pattern with a large widening angle on both sides. Similarly, the number of the left light incident part 41L may be one or more. The number of the right light incident part 41R may be one or more.

In the following, a vehicle light assembly including a left reflection part 31L, a right reflection part 31R, a left light incident part 41L, and a right light incident part 41R is taken as an example, and the number of the left light incident part 41L and the right light incident part 41R are both one, and the preferred solution of the vehicle lamp assembly is described.

In the vehicle lamp assembly of the present disclosure, the edge light incident part 41 needs to emit light outward, so the edge light incident part 41 is arranged obliquely. Therefore, the optical axis of the edge light incident part 41 is also obliquely arranged. Specifically, the optical axis of the edge light incident part 41 is obliquely arranged in such a way that the further forward, the closer to the edge reflection part 31. Based on this, the optical axis of the left light incident part 41L extends obliquely to the front left, and the optical axis of the right light incident part 41R extends obliquely to the front right. The optical axes of the plurality of middle light incident portions 42 are all inclinedly arranged in a way that the further forward, the closer to the optical axis of the secondary optical element 50. During the operation of the above-mentioned vehicle lamp assembly, at least a part of the light emitted from the light source 10 matched with the left light incident part 41L will be emitted to the left reflection part 31L, be emitted from the primary optical element 20 after being reflected by the left reflection part 31L, and finally be emitted to the secondary optical element 50 to form a vehicle lamp light pattern with a large right widening angle. Similarly, at least a part of the light emitted from the light source 10 matched with the right light incident part 41R will be emitted to the right reflection part 31R, be emitted from the primary optical element 20 after being reflected by the right reflection part 31R, and finally be emitted to the secondary optical element 50 to form a vehicle lamp light pattern with a large right widening angle.

Figure 8:
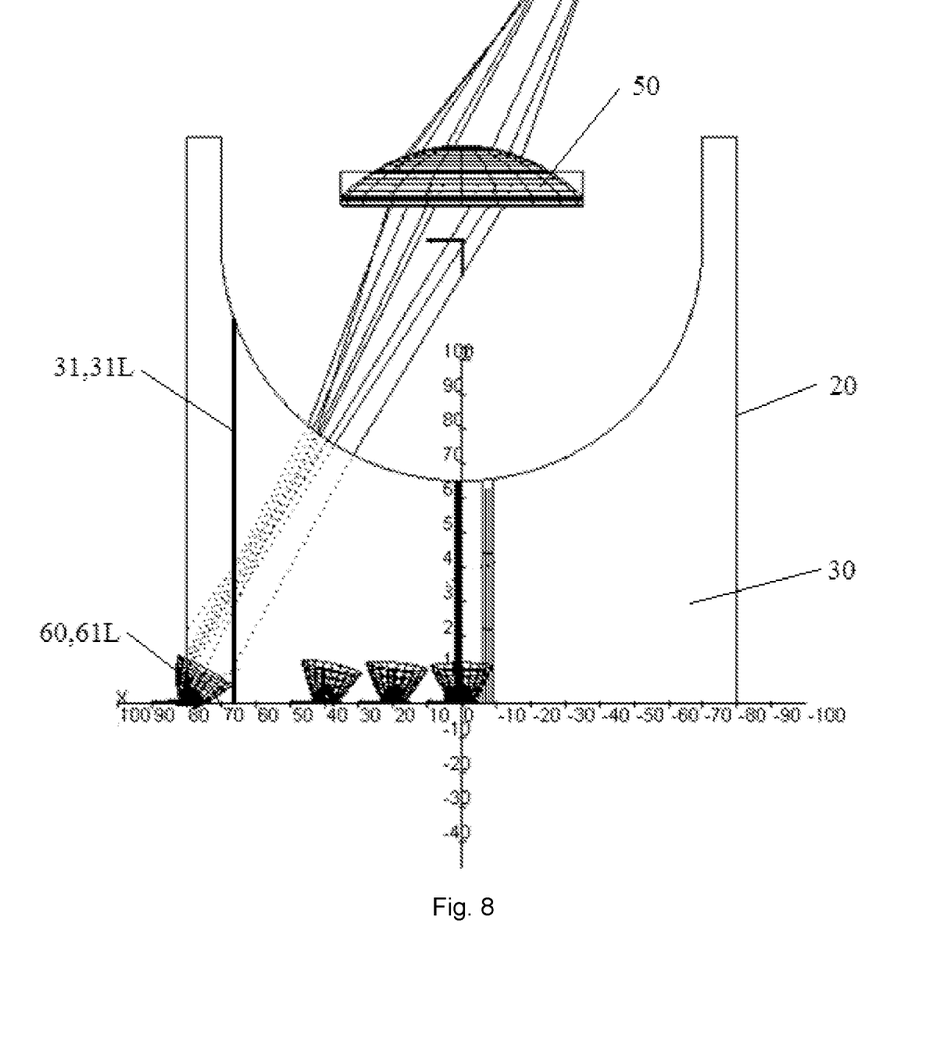
FIGS. 8-9 show schematic views of the process of setting the position of an edge reflection part and an edge light incident part according to the present disclosure.
Figure 9:
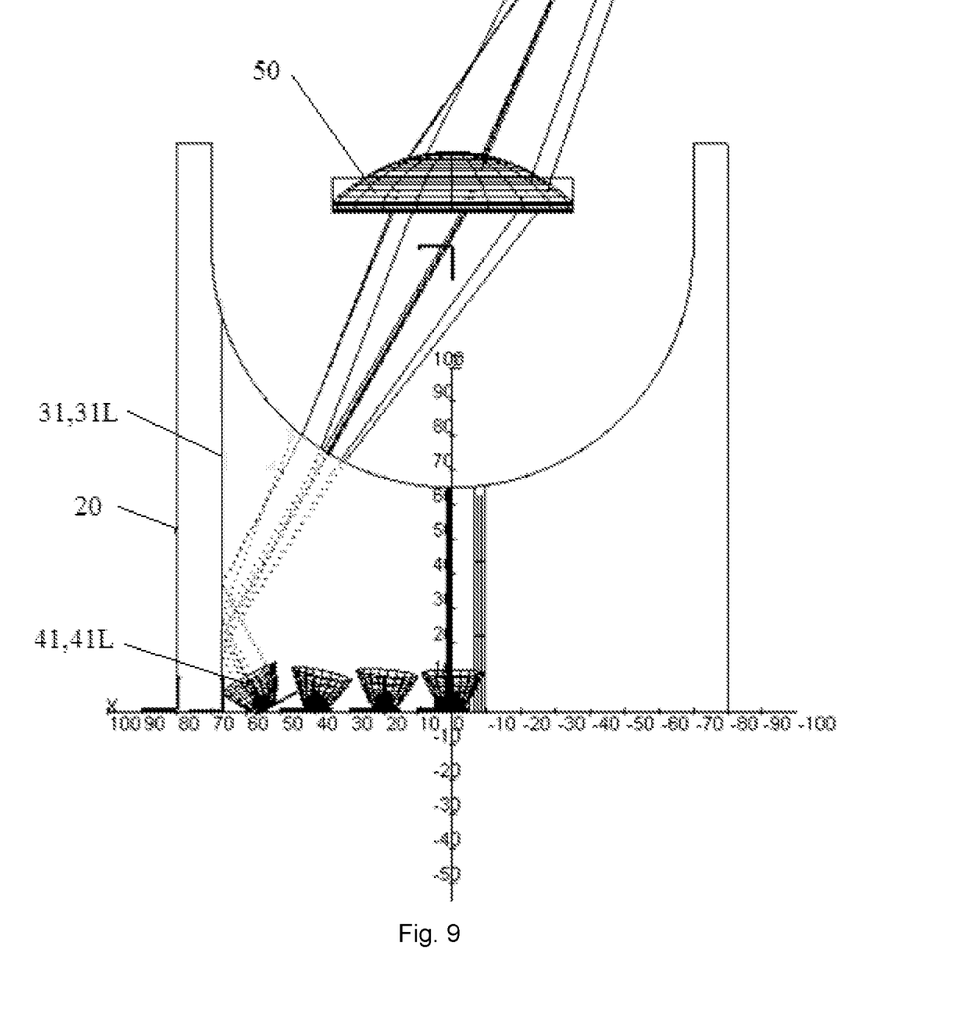

Furthermore, when there is only one left light incident part 41L, the positions of the left reflection part 31L and the left light incident part 41L in the primary optical element 20 may be set by the following method. First, according to the desired requirements of the right widening angle of the vehicle lamp light pattern, the leftmost light incident part 400 of the existing primary optical element 20 in FIG. 4 and the light source 10 matched with it are moved to the left to a suitable position. As shown in FIG. 8, the moved light incident part 400 is defined as a left virtual light incident part 61L. The inclination angle of the left virtual light incident part 61L is adjusted to make the angle of the direction of the light emitted from the left virtual light incident part 61L meet the requirements for the right widening angle of the vehicle lamp light pattern. Second, there is one left virtual light incident part 61L, which also constitutes the innermost virtual light incident part on the left side closest to the middle of the primary optical element 20. A reflection part is arranged on the right side of the left virtual light incident part 61L close to the middle of the primary optical element 20, the reflection part is next to the left virtual light incident part 61L and extends in a front-rear direction. As shown in FIG. 8, the reflection part is an edge reflection part 31 on the left side, that is, a left reflection part 31L of the primary optical element 20 is obtained. Third, the left virtual light incident part 61L is mirrored by the left reflection part 31L that serves as a mirror surface to obtain the left mirror light incident part. As shown in FIG. 9, the left mirror light incident part is an edge light incident part 41 on the left side, that is, a left light incident part 41L of the primary optical element 20 is obtained.

Particularly, the direction of the light emitted by the left light incident part 41L after being reflected by the left reflection part 31L is the same as the direction of the light emitted by the left virtual light incident part 61L, the left light incident part 41L, and the left virtual light incident part 61L are mirrored with respect to the left reflection part 31L. Since the direction of the light emitted by the left virtual light incident part 61L has met the requirements of a large right widening angle of the vehicle lamp light pattern, the light reflected from the left light incident part 41L and the left reflection part 31L arranged in this manner can also achieve a large right widening angle of the vehicle lamp light pattern.

When multiple left light incident parts 41L are provided, the positions of the left reflection part 31L and the left light incident parts 41L in the primary optical element 20 may be set by the following method. First, according to the desired requirements of the right widening angle of the vehicle lamp light pattern, multiple light incident parts 400 on the left side of the existing primary optical element 20 in FIG. 4 and light sources 10 matched with them are moved to the left to a suitable position. The moved multiple light incident parts 400 are defined as left virtual light incident parts 61L. The inclination angle of the left virtual light incident part 61L is adjusted to make the angle of the direction of the light emitted from the left virtual light incident part 61L meet the requirements for the right widening angle of the vehicle lamp light pattern. Second, among the plurality of left virtual light incident parts 61L, the one closest to the middle of the primary optical element 20 is the innermost virtual light incident part. On the right side of the innermost virtual light incident part on the left side close to the middle of the primary optical element 20, a reflecting part that is close to the innermost virtual light incident part and extends in a front-rear direction is provided. The reflection part is an edge reflection part 31 on the left side, that is, the left reflection part 31L of the primary optical element 20 is obtained. Third, the plurality of left virtual light incident parts 61L is mirrored by the left reflection part 31L that serves as a mirror surface to obtain the plurality of left mirror light incident parts. The plurality of left mirror light incident parts is an edge light incident part 41 on the left side, that is, a left light incident part 41L of the primary optical element 20 is obtained.

Similarly, when there is one and only one right light incident part 41R, the positions of the right reflection part 31R and the right light incident part 41R in the primary optical element 20 may be set by the following method. First, according to the desired requirements of the left widening angle of the vehicle lamp light pattern, the rightmost light incident part 400 of the existing primary optical element 20 in FIG. 4 and the light source 10 matched with it are moved to the right to a suitable position. The moved light incident part 400 is defined as a right virtual light incident part, and the inclination angle of the right virtual light incident part is adjusted to make the angle of the direction of the light emitted from the right virtual light incident part meet the requirements for the left widening angle of the vehicle lamp light pattern. Second, there is one right virtual light incident part, which also constitutes the innermost virtual light incident part on the right side closest to the middle of the primary optical element 20. A reflection part is arranged on the left side of the right virtual light incident part close to the middle of the primary optical element 20, the reflection part is next to the right virtual light incident part and extends in a front-rear direction. The reflection part is an edge reflection part 31 on the right side, that is, a right reflection part 31R of the primary optical element 20 is obtained. Third, the right virtual light incident part is mirrored by the right reflection part 31R that serves as a mirror surface to obtain the right mirror light incident part. The right mirror light incident part is an edge light incident part 41 on the right side, that is, a right light incident part 41L of the primary optical element 20 is obtained. Particularly, the direction of the light emitted by the right light incident part 41R after being reflected by the right reflection part 31R is the same as the direction of the light emitted by the right virtual light incident part, the right light incident part 41R and the right virtual light incident part are mirrored with respect to the right reflection part 31R. Since the direction of the light emitted by the right virtual light incident part has met the requirements of a large left widening angle of the vehicle lamp light pattern, the light reflected from the right light incident part 41R and the right reflection part 31R arranged in this manner can also achieve a large left widening angle of the vehicle lamp light pattern.

When there is a plurality of right light incident parts 41R, the positions of the right reflection part 31R and the right light incident parts 41R in the primary optical element 20 may be set by the following method. First, according to the desired requirements of the left widening angle of the vehicle lamp light pattern, multiple light incident parts 400 on the right side of the existing primary optical element 20 in FIG. 4 and the light source 10 matched with it are moved to the right to a suitable position. The moved multiple light incident parts 400 are defined as right virtual light incident parts, and the inclination angle of the right virtual light incident parts is adjusted to make the angle of the direction of the light emitted from the right virtual light incident parts meet the requirements for the right widening angle of the vehicle lamp light pattern. Second, among the plurality of right virtual light incident parts, the one closest to the middle of the primary optical element 20 is the innermost virtual light incident part. On the left side of the innermost virtual light incident part on the right side close to the middle of the primary optical element 20, a reflecting part that is close to the innermost virtual light incident part and extends in a front-rear direction is provided. The reflection part is an edge reflection part 31 on the left side, that is, the right reflection part 31R of the primary optical element 20 is obtained. Third, a plurality of right virtual light incident parts is mirrored by the right reflection part 31R that serves as a mirror surface to obtain a plurality of right mirror light incident parts. The plurality of right mirror light incident parts is edge light incident parts 41 on the right side, that is, right light incident parts 41R of the primary optical element 20 are obtained.

Both the left virtual light incident part 61L involved in the above process of arranging the left reflection part 31L and the left light incident part 41L, and the right virtual light incident part involved in the process of arranging the right reflection part 31R and the right light incident part 41R are the virtual light incident part 60. The virtual light incident part 60 is an intermediate part in the intermediate process of setting the position for facilitating the position setting of the edge reflection part 31 and the edge light incident part 41. There is no virtual incident part 60 in the final primary optical element 20 product.

It can be seen from the above content that the present disclosure can increase the right widening angle of the vehicle lamp light pattern formed by the lamp assembly by arranging the left light incident part 41L and the matching left reflecting part 31L. The light incident part 41R and the right reflection part 31R matched with it can increase the left widening angle of the vehicle lamp light pattern formed by the vehicle lamp assembly. On the premise of achieving the same widening angle, compared with moving the outermost light incident part 400 outward in the prior art, both the left light incident part 41L and the right light incident part 41R in the present disclosure move inwardly. The left light incident part 41L is next to the left reflection part 31L, the right light incident part 41R is next to the right reflection part 31R, and the left reflection part 31L and the right reflection part 31R are respectively arranged at the left side surface and the right side surface of the primary optical element 20, so that both the left side surface and the right side surface of the primary optical element 20 move inward. Therefore, the present disclosure can reduce the size of the primary optical element in the horizontal direction and the size of the circuit board while increasing the widening angle, thereby correspondingly reducing the overall size and occupied space of the vehicle lamp assembly, thus reducing the production cost of the vehicle lamp assembly. In this embodiment, the widening angle in the horizontal of the vehicle lamp light pattern formed by the edge light incident part 41 and the edge reflection part 31 matched with it ranges from 40° to 90°, preferably 45°.

Further, in the above-mentioned vehicle lamp assembly, the optical axis of the light source 10 corresponding to each light incident part 40 is consistent with the optical axis direction of the corresponding light incident part 40. Alternatively, the optical axis directions of the light sources 10 are all the same. Preferably all of the axes are the same as the optical axis direction of the light source 10 located in the middle, so that multiple light sources 10 can be arranged on the same circuit board with a planar structure, thereby further reducing the production cost of the vehicle lamp assembly. In addition, the focal length of the lens constituting the secondary optical element 50 is 50 mm, which can improve the technical effect of the primary optical element 20. The vehicle lamp assembly with a large lens focal length also has the advantages of thin lens, good dispersion, and high illuminance.

Further, in the above-mentioned vehicle lamp assembly, the primary optical element body 30 has multiple implementation structures. Correspondingly, the edge reflection part 31 also has multiple implementation structures. Based on the different implementation structures of the primary optical element body 30 and the edge reflection part 31, the vehicle lamp assembly has multiple preferred embodiments. Two preferred embodiments of the vehicle lamp assembly will be described in the following.

Preferred Embodiment 1 of the Vehicle Lamp Assembly

Figure 11:
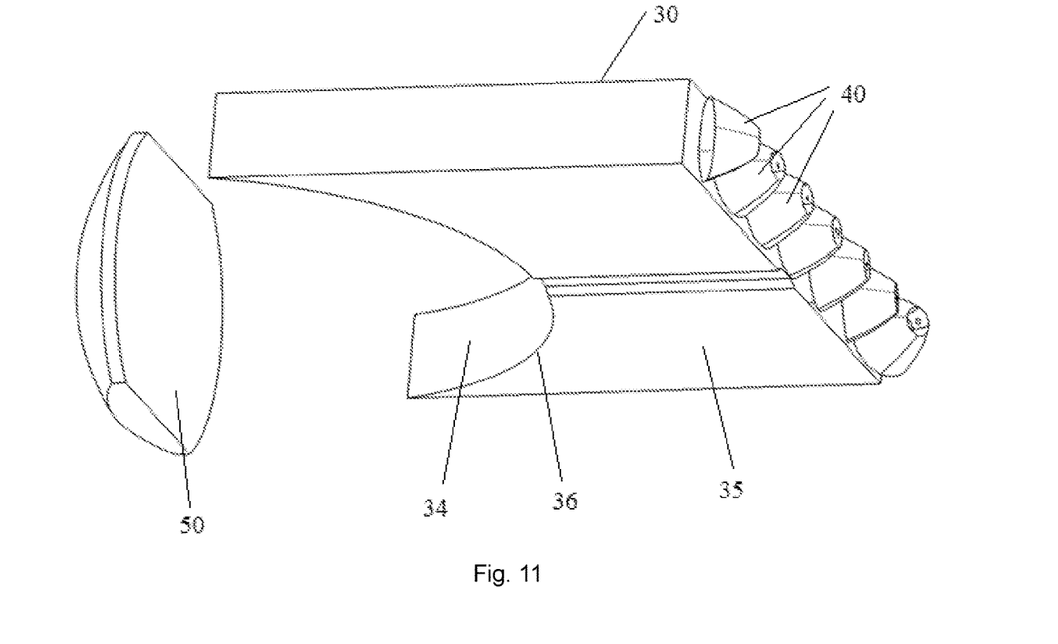
Figure 12:
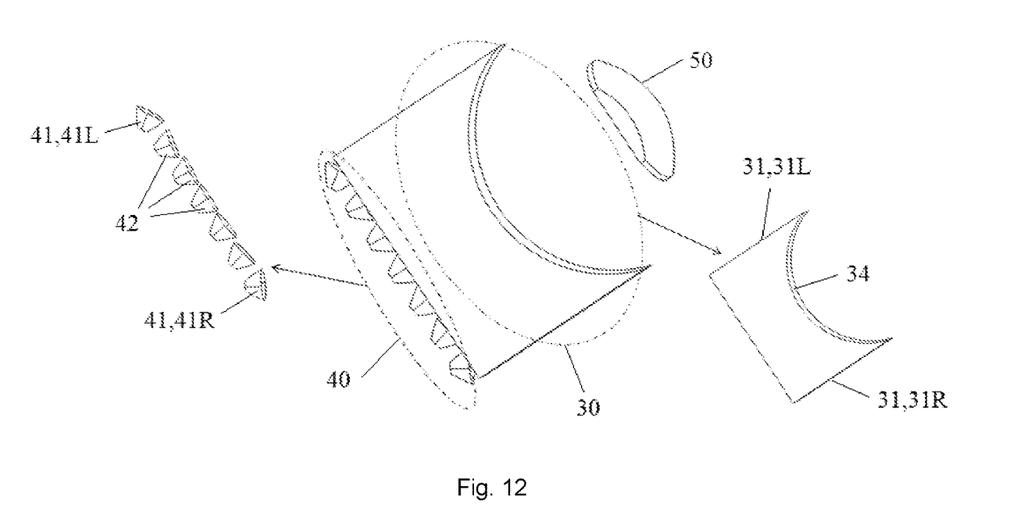

As shown in FIGS. 10 to 12, the preferred embodiment 1 of the vehicle lamp assembly includes a plurality of light sources 10, a primary optical element 20, and a secondary optical element 50 placed in front of the primary optical element 20. The primary optical element 20 includes a primary optical element body 30, and a plurality of light incident parts 40 arranged at a rear end of the primary optical element body 30 and arranged in a left-right direction. Each light incident part 40 corresponds to a light source 10, so the plurality of light sources 10 is in one-to-one correspondence with the plurality of light incident parts 40. The primary optical element body 30 is a transparent entity with a light emitting surface 34 at the front end. The primary optical element body 30 may be made of transparent materials such as glass, silica gel or plastic. The left side and right side of the primary optical element body 30 are arranged with side reflective surfaces extending straight in a front-rear direction. The side reflecting surface on the left side constitutes a left reflection part 31L of the primary optical element body 30. The side reflecting surface on the right side constitutes a right reflection part 31R of the primary optical element body 30. The left reflection part 31L and the right reflection part 31R are edge reflection parts 31 in the primary optical element body 30. The lower end surface of the primary optical element body 30 is a lower reflecting surface 35. The plurality of light incident parts 40 includes a left light incident part 41L next to the right side of the left reflection part 31L, a right light incident part 41R next to the left side of the right reflection part 31R, and a plurality of middle light incident parts 42. The left light incident part 41L and the right light incident part 41R are the edge light incident parts 41 of the primary optical element 20.

In the preferred embodiment 1 of the above-mentioned vehicle lamp assembly, part of the light emitted from each middle light incident part 42 is directly incident to the light emitting surface 34 of the primary optical element body 30, and the other part of the light is incident to the lower reflecting surface 35 of the primary optical element body 30 and is reflected by the lower reflecting surface 35 to the light emitting surface 34 of the primary optical element body 30. Part of the light emitted from the left light incident part 41L is incident to the side reflecting surface on the left side surface of the primary optical element body 30 and reflected by the side reflecting surface (i.e. the left reflecting part 31L) to the light emitting surface 34 of the primary optical element body 30, and the other part of the light is incident to the lower reflecting surface 35 of the primary optical element body 30 and is reflected by the lower reflecting surface 35 to the light emitting surface 34 of the primary optical element body 30. Part of the light emitted from the right light incident part 41R is incident to the side reflecting surface on the right side surface of the primary optical element body 30 and reflected by the side reflecting surface (i.e. the right reflecting part 31R) to the light emitting surface 34 of the primary optical element body 30, and the other part of the light is incident to the lower reflecting surface 35 of the primary optical element body 30 and is reflected by the lower reflecting surface 35 to the light emitting surface 34 of the primary optical element body 30. The light emitted from the light emitting surface 34 is all emitted to the secondary optical element 50.

Preferably, the light emitting surface 34 at the front end of the primary optical element body 30 is a backward concave arc surface to adapt to the object focal surface of the secondary optical element 50, so that the formed light pattern is clearer. At the same time, the preferred embodiment 1 of the vehicle lamp assembly may be applied to the low beam vehicle lamp assembly as well as the high beam vehicle lamp assembly. When the preferred embodiment 1 of the vehicle lamp assembly is applied to the low beam vehicle lamp assembly, as shown in FIG. 11, the lower edge of the light emitting surface 34 includes a cutoff portion 36 for forming a low beam cutoff line, and the light is cut off by the cutoff portion 36 and then projected by the secondary optical element 50 to form a low beam cutoff line. When the preferred embodiment 1 of the vehicle lamp assembly is applied to the high beam vehicle lamp assembly, the cut-off portion may not be arranged, or the cut-off portion may be arranged on the upper edge of the light emitting surface 34 to form a high beam cut-off line. In addition, the primary optical element body 30 and the plurality of light incident parts 40 have an integrated structure or a split structure.

Preferred Embodiment 2 of the Vehicle Lamp Assembly

As shown in FIG. 13, the preferred embodiment 2 of the vehicle lamp assembly includes a plurality of light sources 10, a primary optical element 20, and a secondary optical element 50 placed in front of the primary optical element 20. The primary optical element 20 includes a primary optical element body 30, and a plurality of light incident parts 40 arranged at a rear end of the primary optical element body 30 and arranged in a left-right direction. Each light incident part 40 corresponds to a light source 10, so the plurality of light sources 10 is in one-to-one correspondence with the plurality of light incident parts 40. The primary optical element body 30 includes a main reflector 32, and an edge reflector 33 arranged on the left edge and/or right edge of the main reflector 32. In the preferred embodiment 2 of the vehicle lamp assembly shown in FIG. 13, there are two edge reflectors 33, namely the left reflector 33L placed on the left edge side of the main reflector 32, and the right reflector 33R place on the right edge side of the main reflector 32. The left reflector 33L constitutes the left reflection part 31L of the primary optical element body 30, and the right reflector 33R constitutes the right reflection part 31R of the primary optical element body 30, and the left reflection part 31L and the right reflection part 31R are the edge reflection parts 31 of the primary optical element body 30. The plurality of light incident parts 40 includes a left light incident part 41L next to the right side of the left reflector 33L, a right light incident part 41R next to the left side of the right reflector 33R, and a plurality of middle light incident parts 42. The left light incident part 41L and the right light incident part 41R are the edge light incident parts 41 of the primary optical element 20. The left reflector 33L and the right reflector 33R both extend in the front-rear direction and are perpendicular to the main reflector 32. The right side surface of the left reflector 33L is a reflecting surface, the left side surface of the right reflector 31R is a reflecting surface, and the upper end surface of the main reflector 32 is a reflecting surface. The lower ends of the left reflector 33L and the right reflector 33R both extend downward to the upper end of the main reflector 32.

In the preferred embodiment 2 of the above-mentioned assembly, part of the light emitted from each middle light incident part 42 is directly incident to the secondary optical element 50, and the other part of the light is incident to the main reflector 32 and reflected by the main reflector 32 to the secondary optical element 50. Part of the light emitted from the left light incident part 41L is incident to the left reflector 33L, is reflected by the left reflector 33L to the secondary optical element 50, and the other part of the light is incident to the main reflector 32 and reflected by the main reflector 32 to the secondary optical element 50. Part of the light emitted from the right light incident part 41R is incident to the right reflector 33R, is reflected by the right reflector 33R to the secondary optical element 50, and the other part of the light is incident to the main reflector 32 and reflected by the main reflector 32 to the secondary optical element 50. Compared with the preferred embodiment 1 of the assembly, in the preferred embodiment 2 of the assembly, the primary optical element body 30 adopts a plate-shaped reflector structure, which can save materials and reduce costs.

Preferably, the main reflector 32, the left reflector 33L, and the right reflector 33R have an integrated structure or a split structure. All the reflectors can be set as a plate-like structure made of plastic or metal. The surface of the reflectors can be coated with a reflective coating, and the reflective coating is preferably an aluminized surface. At the same time, the preferred embodiment 2 of the vehicle lamp assembly can be applied to the low beam vehicle lamp assembly as well as the high beam vehicle lamp assembly. When the preferred embodiment 2 of the vehicle lamp assembly is applied to the low beam vehicle lamp assembly, as shown in FIG. 13, the front edge of the main reflector 32 is a section of arc that is concave backward, and the section of arc includes a cutoff portion 36 for forming a low beam cutoff line, and the light is cut off by the cutoff portion 36 and then projected by the secondary optical element 50 to form a low beam cutoff line. When the preferred embodiment 2 of the vehicle lamp assembly is applied to the high beam vehicle lamp assembly, the main reflector 32 does not include a cut-off portion.

As mentioned above, the present disclosure effectively overcomes various shortcomings in the existing technology and has high industrial utilization value.

The above-mentioned embodiments are just used for exemplarily describing the principle and effects of the present disclosure instead of limiting the present disclosure. Those skilled in the art can make modifications or changes to the above-mentioned embodiments without going against the spirit and the range of the present disclosure. Therefore, all equivalent modifications or changes made by those who have common knowledge in the art without departing from the spirit and technical concept disclosed by the present disclosure shall be still covered by the claims of the present disclosure.

We claim:

1. A vehicle lamp assembly, comprising a plurality of light sources (10), a primary optical element (20), and a secondary optical element (50) placed in front of the primary optical element (20), the primary optical element (20) includes a primary optical element body (30), and a plurality of light incident parts (40) horizontally arranged at a rear end of the primary optical element body (30), the plurality of light sources (10) is in one-to-one correspondence with the plurality of light incident parts (40), wherein the primary optical element body (30) comprises a main reflector (32), and an edge reflector (33) arranged on a left edge and/or right edge of the main reflector (32), the plurality of light incident parts (40) includes an edge light incident part (41) located on a left side and/or right side, at least a part of light emitted from the edge light incident part (41) is reflected to the secondary optical element (50) by the edge reflector (33), and a remaining part of the light is reflected to the secondary optical element (50) by the main reflector (32);

wherein among the plurality of light incident parts (40), the light incident parts (40) except for the edge light incident parts (41) are middle light incident parts (42), a part of light emitted from the middle light incident parts (42) directly enters the secondary optical element (50), and a remaining part of the light is reflected to the secondary optical element (50) by the main reflector (32);

wherein an optical axis of the edge light incident part (41) is inclinedly arranged in a manner that the farther forward, the closer to the edge reflector (33).

2. The vehicle lamp assembly according to claim 1, wherein a position of the edge reflector (33) and the edge light incident part (41) in the primary optical element (20) is set by the following operations:

setting a virtual light incident part (60) according to a desired widening angle of a light pattern of a vehicle lamp, and adjusting an inclination angle of the virtual light incident part (60) to make a direction of light emitted by the virtual light incident part (60) meet the desired widening angle of the light pattern of the vehicle lamp;

the virtual light incident part (60) includes an innermost virtual light incident part closest to a middle of the primary optical element (20), a reflector close to the innermost virtual light incident part and extending in a front-rear direction is placed on a side of the innermost virtual light incident part close to the middle of the primary optical element (20), the reflector is the edge reflector (33); and obtaining a mirrored light incident part by mirroring the virtual light incident part (60) with the edge reflector (33), and the mirrored light incident part is the edge light incident part (41).

3. The vehicle lamp assembly according to claim 1, wherein the edge reflector (33) extends in a front-rear direction and is perpendicular to the main reflector (32).

4. The vehicle lamp assembly according to claim 1, wherein the plurality of light sources (10) are arranged on a same circuit board, and the circuit board has a planar structure.

5. The vehicle lamp assembly according to claim 1, wherein the main reflector (32) and the edge reflector (33) have an integrated structure or a split structure.

6. The vehicle lamp assembly according to claim 1, wherein a front edge of the main reflector (32) is a section of arc that is concave backward, and a cut-off portion (36) is placed on the section of arc.

7. A vehicle lamp, comprising the vehicle lamp assembly of any one of claim 1.

8. A vehicle, comprising the vehicle lamp of claim 7.

* * * * *